No. 768,836. PATENTED AUG. 30, 1904.
R. G. & K. K. WRIGHT.
APPARATUS FOR FILLING BOTTLES.
APPLICATION FILED MAY 29, 1903.
NO MODEL.
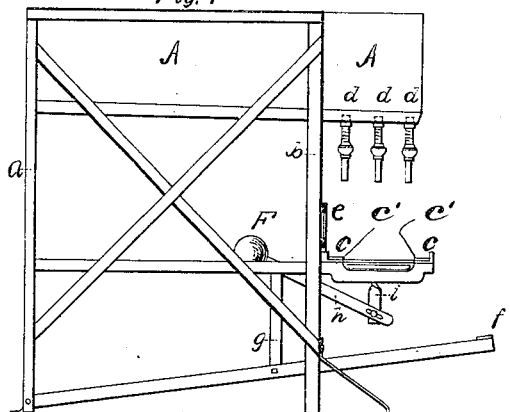
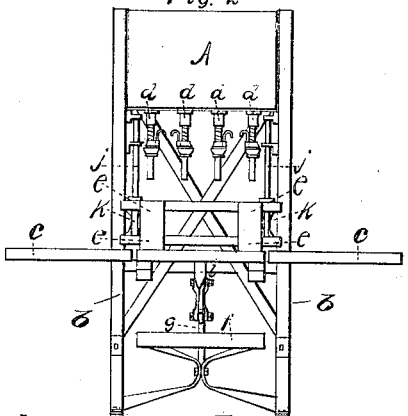
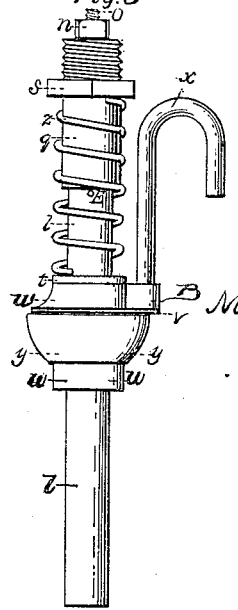
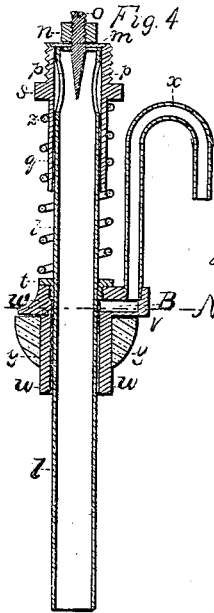
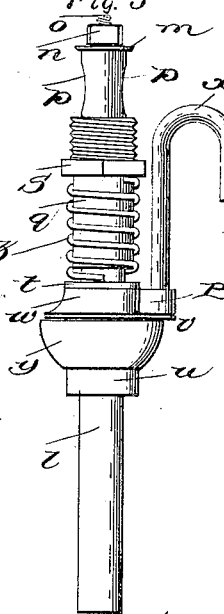
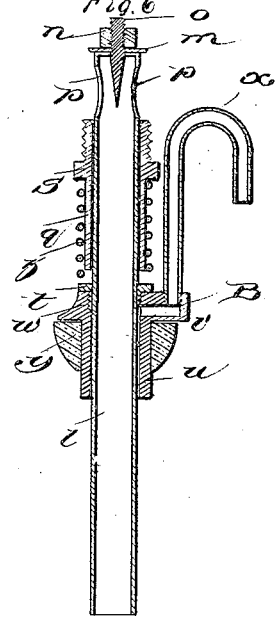
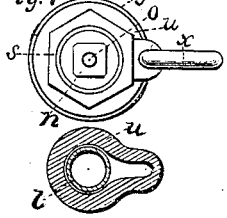
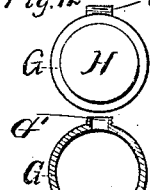
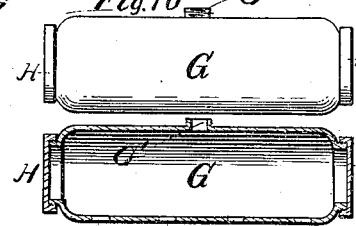
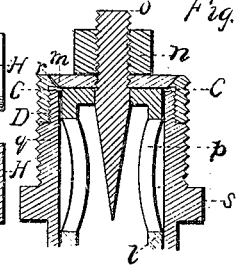
WITNESSES:
Elisha E. Lockefaur
Geo. T. Davis
INVENTORS
Ralph G. Wright
Wm. K. Wright
BY
Duell, Megrath & Warfield
ATTORNEYS No. 768,836. Patented August 30, 1904.

UNITED STATES PATENT OFFICE.

RALPH G. WRIGHT AND KIRK K. WRIGHT, OF BUFFALO, NEW YORK.

APPARATUS FOR FILLING BOTTLES.

SPECIFICATION forming part of Letters Patent No. 768,836, dated August 30, 1904.

Application filed May 29, 1903. Serial No. 159,251. (No model.)

*To all whom it may concern:*

Be it known that we, RALPH G. WRIGHT and KIRK K. WRIGHT, residing at Buffalo, in the county of Erie and State of New York, have invented certain new and useful Improvements in Apparatus for Filling Bottles, of which the following is a full, clear, and exact description, such as will enable others skilled in the art to which it appertains to make and use the same.

Our invention relates to improvements in apparatus for bottling liquids of all kinds, and especially for bottling milk and those liquids which by overflowing to the outside of the bottles while being filled are liable to taint or soil the outside of the bottles.

The object of the invention is to provide an easily-operated, cheap, reliable, sanitary, and effective apparatus for bottling all liquids without waste even when bottles that are being filled at the same time are of different heights and have mouths of different sizes.

Other objects will appear from the hereinafter description.

We declare the following to be a full, clear, and exact description of our invention, such as will enable others skilled in the art to which the apparatus appertains to make and use the same, reference being made to the accompanying sheet of drawings, which forms part of this specification.

In the said drawings, Figure 1 represents a side elevation of the invention. Fig. 2 is a front elevation thereof. Fig. 3 is a side elevation of one of the filling-valves closed. Fig. 4 is a vertical section of the same, taken on a plane passing through the center of the valve. Fig. 5 is an elevation of the filling-valve open. Fig. 6 is a side section of the same, taken on a vertical plane passing through the center of the valve. Fig. 7 is a top plan view of the valve. Fig. 8 is a cross-section of the same, taken on the line $m\ n$, Fig. 4. Fig. 9 is an enlarged vertical section of the upper part of the valve, showing a modified form of construction. Fig. 10 is a side view of a form of tank to be used for bottling beer or other liquids having a permanent pressure or head. Fig. 11 is a vertical section of this tank. Fig. 12 is an end view, and Fig. 13 is a cross-section, thereof.

Referring to the drawings in detail, in which like reference-letters designate the same parts in the different views, the letter A represents the tank containing the liquid to be bottled. This tank is supported on a frame having four legs $a\ a\ b\ b$, the two rear legs being on the rear corners of the frame while the two front legs are a short distance in front of the central line of the frame. This construction of the frame permits the tank to extend beyond the front legs $b$ and over a horizontal track $c\ c$, connected to or forming a part of the said frame. The tank is so supported on this framework that its front end is slightly lower than the rear, so that the liquid will flow or collect toward the front end. The bottom of the tank forward of the legs $b$ is provided with a number of holes $d$, corresponding to the number of bottles contained in a specially-made case or crate, these holes having their centers the same distance apart as the mouths of the bottles while occupying places in said case or crate. An externally-screw-threaded collar, to be hereinafter described in connection with the valve, is secured in each of these holes and through which the upper end of the tube of the valve passes.

Located on the front end of the frame and under the valves is a basket $e$, adapted to be moved vertically up and down by means of a foot-tread $f$ and a system of levers $g$, $h$, and $i$. The upper end of the part $i$ is fastened to the bottom of the basket, the lower end working on a pin passing through a slot in the lower or forward end of the lever $h$. This lever is bolted or pivoted at its rear end to the upper end of the lever $g$, the lower end of the lever $g$ being pivoted to the foot-tread $f$, which is forked and is pivoted to the rear legs $a$.

F is a weight secured to the inner end of the lever $h$ to counterbalance the basket $e$. This basket is guided in its vertical movement by the guide-rods $j\ j$, secured by brackets to the inner side of the front legs $b$ and also by the two sleeves or guides $k$, attached to the basket. On either side of this basket and secured to the frame is a section of track so arranged that when the basket is down in its normal position the basket and the two sections form one continuous track or guideway for the crate, this track being of such length as to accommodate three of the crates above referred to when placed end to end on the track. In the operation of the machine the crates are moved from left to right on the track, and on the right-hand end of the right section stops $c'$ are secured so as to prevent a crate from being shoved off the track. The basket is also provided with stops, so that when a crate is slid onto the basket from the left-hand section of track the crate will be stopped in such a position that the necks of the bottles will be directly under the valves.

Figs. 3 to 8 show the construction and operation of the valves that we have invented to use in connection with our apparatus. $l$ is a tube, and a puppet-valve $m$, frusto-conical in shape, is screwed or otherwise secured to the top of the tube, as follows: $o$ is a division or strengthening plate which is secured to the top and soldered to the inside of the tube $l$. That part of the plate within the tube showing on a section at right angles to the section of Figs. 4 and 6 is rectangular in shape. The upper part of the plate $o$ is reduced and made cylindrical in shape, this reduced portion being screw-threaded, as shown, to receive a locknut $n$, which secures the puppet-valve to the upper end of the tube. The upper end of the tube is provided with the elliptical openings $p$ on each side of the division-plate $o$. A sleeve $q$ surrounds and fits snugly the tube $l$. The upper end of this sleeve is provided with a valve-seat $r$, on which the valve $m$ seats. This sleeve is provided with a flange S, formed into a hexagonal nut to accommodate a wrench, by which the valve may be screwed into the screw-threaded collar secured in the holes $d$, above described, the upper part of this sleeve being screw-threaded to fit in said collar. $t$ is a sleeve screw-threaded on the outside, a collar being formed on its upper edge. This sleeve is soldered to the tube $l$ about midway of the length thereof. $u$ is another sleeve screw-threaded onto the sleeve $t$. The sleeve $u$ fits loosely around the tube $l$, leaving a slight space or channel between the inner surface of this sleeve and the outer surface of the tube and is provided with a collar $w$ at its upper end, against which abuts the stopper $y$, fitted over the sleeve $u$. This collar is enlarged at $v$, said enlargement being provided with an opening or chamber which communicates with the channel between the sleeve $u$ and the tube $l$. X is a tube screw-threaded into $v$ and communicates with the chamber therein. $z$ is a spiral spring which fits closely over the sleeve $q$ and the tube $l$, the upper end abutting against the hexagonal nut S and the bottom against the collar or sleeve $t$, so as to normally keep the valve in its closed position, as shown in Figs. 3 and 4. The valve-seat above referred to may be made integral with sleeve $q$, as above described. In Fig. 9, however, is shown a modification in which the upper part of this sleeve may be reduced and provided with screw-threads and a sleeve D, secured on this end of the sleeve, the outer surface of this second sleeve being screw-threaded to correspond with the screw-threads of the sleeve $q$. C is a gasket fitted between the end of the sleeve $q$ and the sleeve D, the latter having an inwardly-projecting flange which fits over the gasket and holds it securely in place and making a tight seat for the valve $n$. The upper end of the sleeve $d$ is inwardly beveled to correspond to the seating-face of the valve $m$. This gasket fits close up against the tube $l$ and forms a tight joint around the tube as the said tube is raised and lowered, thereby preventing entrance of air in and around the valve while the apparatus is idle or while bottles are being filled. The tube $l$ is provided with an air opening or vent E to permit the air to enter the tube below the valve when the valve is in the position shown in Figs. 3 and 4, so that the liquid can quickly run out of the tube as the basket is lowered with the filled bottles.

The apparatus as described operates as follows: A crate containing the number of bottles to be filled, generally a dozen, is placed on the left section of the track $c$, and the crate is then slid to the right onto the basket $e$ against the stop on the basket. When the crate is in this position, the mouth of each of the bottles is directly underneath each one of the valves. The foot-tread $f$ is then pressed down and through the system of levers $g$, $h$, and $i$ the basket carrying the crate of bottles is raised, the basket being guided by the rods $j$ and guides $k$ and the mouths of the bottles being raised and guided to the valves so that the tube fully enters the mouths of the bottles until the stoppers $y$ take against the edge of the bottles, when a movement of the tread $f$ raises the tube $l$ through the sleeve $q$, compressing the spring $z$ until the valve unseats or is open, as shown in Figs. 5 and 6, permitting the liquid to flow from the tank A through the elliptical opening $p$, down the tube, and into the bottles. During this filling operation the air escapes between the loosely-fitting sleeve $u$ and the tube $l$ to the enlargement B and thence through the bent tube $x$. If any liquid should be carried along with the air, it flows out of the bent tube into troughs (not shown) communicating with a receptacle placed in a convenient position. The sleeve $u$ and the stopper $y$ fit into the neck of the bottle and prevent the bottle from being filled to the top. When all the bottles are filled, the pressure of the foot on the tread is removed, whereupon the basket carrying the crate of filled bottles is lowered to its normal position. At the same time the pressure is removed from the spring $z$, which forces the tube down, and the valve is seated. If one bottle should be filled more rapidly than another, the liquid will flow through the tube $x$ and into the receptacle without waste. As soon as the bottles in this crate are filled the crate is moved along to the right section of the track *c* until it abuts against the stops, where the bottles are capped or stoppered. When this is done, another crate of bottles is placed upon the left section of the track, then moved to the right onto the basket, where the operation of filling is repeated.

By this apparatus a large number of bottles occupying separate compartments in the crate can be filled very rapidly and economically, one crate containing the unfilled bottles being in readiness to be moved onto the basket to be filled while another crate is being filled and the third being capped.

The tube *l* is made of such length that it reaches near to the bottom of the bottle. This arrangement greatly decreases the tendency that most liquids have to foam during the process of filling. What foam, however, that rises escapes with the air through the vent-tube, as before described. For most liquids a tank such as A would be found satisfactory; but for bottling beer or other liquids from kegs or barrels under pressure it is preferable to use a tank such as shown in Figs. 10 to 13 on the drawings. This tank G is made of metal and is air-tight. The ends of these tanks are provided with screw-threaded caps H, that may be readily removed and permit access to the inside of the tank, so that they can be readily cleaned. This tank is provided with openings *i*, which may be screw-threaded to permit the valves to be screwed into the tanks. This tank occupies the same relative position on the frame that the forward end of the tank A does. In other words, it is located so that the valve will be directly under the bottles to be filled. The upper part of this tank is provided with a screw-threaded nipple G', onto which a flexible tube or pipe is connected, which leads to the barrel or keg containing the liquid under pressure.

It is quite evident that various changes may be made in this device as disclosed without departing from the spirit of our invention. We therefore do not limit ourselves to the exact construction herein shown and described.

Having described our invention, what we claim as new, and desire to secure by Letters Patent, is—

1. In an apparatus for filling bottles, a tank, a series of valves connected to the tank, each of said valves consisting of a tube having an opening near the upper end thereof and a valve secured to said upper end, a sleeve surrounding the tube having a valve-seat thereon against which the valve on the tube seats, another sleeve rigidly and removably connected to the tube whereby when the latter sleeve is raised the tube is moved through the first sleeve to unseat the valve and to uncover an opening through which liquid may pass into the tube, the said second sleeve and tube being so adapted and arranged as to leave a channel or passage-way between the said sleeve and tube, as and for the purpose set forth.

2. In an apparatus for filling bottles, a valve consisting of a screw-threaded sleeve adapted to fit in a tank to hold liquid to be bottled, a tube adapted to move vertically in the tank, the upper end of the tube carrying a valve, this end of the tube also having openings through which a liquid may pass, when the valve is unseated, a sleeve secured to the tube, the said sleeve fitting loosely around the tube whereby there is a passage-way formed between the tube and the inner surface of the sleeve, and means between the two sleeves to keep the valve normally on its seat as and for the purposes specified.

3. In an apparatus for filling bottles, a tube closed at its upper end and having a valve connected thereto and also having openings below the upper end thereof, a sleeve surrounding the upper end of the tube to close the openings and on which the valve is seated, said sleeve being adapted to be attached to a tank containing a liquid to be bottled, a sleeve secured to but loosely surrounding the said tube, said sleeve having a recess therein, a bent tube communicating with said recess and a spring between the two sleeves and surrounding the tube, said spring adapted to keep the valve normally on its seat and the opening at the upper end of the tube closed.

4. In an apparatus for filling bottles, a tank adapted to contain the liquid to be bottled, a series of openings in said tank, a series of valves connected to said openings, each valve consisting of a sleeve screw-threaded into the opening, the upper end of this sleeve being provided with a valve-seat, a tube the upper end of which is normally surrounded by the sleeve, a valve carried on the upper end of the tube, said end of the tube being provided with openings through which liquid may pass from the tank into the tube and into the bottles to be filled, a division-plate in the upper end of the tube and opposite the openings, a collar surrounding the tube and secured thereto, said collar having a recess or opening therein, a bent tube communicating with said recess, a spiral spring surrounding the collar and tube adapted to hold the valve in its seated position, a track consisting of a series of sections, one of which is adapted to be moved vertically and to carry bottles to be filled to the valve so that the mouth of the bottle will contact with the sleeve connected to the tube whereby upon the raising of the section the valve will be unseated and the liquid will pass from the tank into the bottles and means for operating the movable section as and for the purposes set forth.

5. In an apparatus for filling bottles, a tube, a valve secured to the top of the tube, this end of the tube also being provided with openings, a sleeve surrounding and snugly fitting the tube, the upper end of this sleeve being provided with a valve-seat, a flange formed on said sleeve, another sleeve secured to the tube and having a collar formed upon its upper edge, a third sleeve also provided with a collar at its upper end and with an enlargement provided with a chamber communicating with the inside of the sleeve, a bent tube connected to said compartment and communicating with the chamber therein, a stopper fitting over the lower portion of the last-mentioned sleeve and abutting against the collar thereof and a spiral spring fitting over the first-mentioned sleeve and the tube, the upper end of which abuts against the flange of the first-mentioned sleeve and the lower end abuts against the flange of the second sleeve as and for the purposes set forth.

6. In an apparatus for filling bottles, a tube, a valve secured to the top of the tube, a division-plate secured within the upper end of the tube, adjacent to the valve, this end of the tube also being provided with openings, a sleeve surrounding and snugly fitting the tube, the upper end of this sleeve being provided with a valve-seat, a flange formed on said sleeve, another sleeve secured to the tube and having a collar formed upon its upper edge, a third sleeve which is also provided with a collar at its upper end and with an enlargement provided with a compartment with the inside of the sleeve, a bent tube connected to said compartment and communicating with the openings therein, a stopper fitting over the lower portion of the last-mentioned sleeve and abutting against the collar thereof and a spiral spring fitting over the first-mentioned sleeve and the tube, the upper end of which abuts against the flange of the first-mentioned sleeve and the lower end abuts against the flange of the second sleeve as and for the purposes set forth.

7. In an apparatus for filling bottles, a tank adapted to contain the liquid to be bottled, an opening in said tank, a valve connected to said opening, said valve consisting of a sleeve screw-threaded into the opening, the upper end of this sleeve being provided with a valve-seat $r$, a tube the upper end of which is normally surrounded by the sleeve, a valve carried on the upper end of the tube, this end of the tube being provided with openings through which liquid may pass from the tank into the tube and into the bottles to be filled, a division-plate in the upper end of the tube opposite the openings, a collar surrounding the tube and secured thereto, said collar having a recess or chamber therein, a tube communicating with said chamber and a spiral spring surrounding the collar and tube and adapted to hold the valve in its seated position, substantially as and for the purposes set forth.

8. In an apparatus for filling bottles, a frame, a tank supported on the frame, a series of valves connected to the tank, each of said valves consisting of a tube having an opening at or near the upper end thereof, a sleeve having an air-vent therein connected to the tube and adapted to be raised therewith, a track connected to the frame divided into sections, one section extending underneath the valves and adapted to support a receptacle for bottles, and means for moving the valves and the bottle-receptacles relatively toward each other whereby when the valves and bottles come in contact the tubes of the valves are moved to uncover the openings in the tank through which liquid may pass into the bottles.

9. In an apparatus for filling bottles, a frame, a tank supported on the frame, a series of valves connected to the tank, each of said valves consisting of a tube having an opening near the upper end thereof, a sleeve surrounding the tube, said sleeve securing the valve to the tank, another sleeve connected to the tube and adapted to be moved with the tube, a track divided into sections and extending underneath the valves secured to the tank, said track adapted to support crates carrying bottles, one of said sections being adapted to be moved vertically and to raise a crate of bottles to be filled against the valves, and means connected to said section whereby the said section may be raised so that the bottles will be moved against the valves to move the tubes through the first sleeve, whereby the openings in the tubes are uncovered and liquid is permitted to pass to the bottles.

10. In an apparatus for filling bottles, a frame, a tank supported on the frame, said tank having a series of openings therein, a series of valves connected to the tank each valve consisting of a screw-threaded sleeve adapted to fit in an opening in the tank, a tube adapted to move vertically in the tank, the upper end of which carries a valve, said end also having an opening therein through which liquid may pass when the valve is unseated, a sleeve secured to the tube and adapted to be raised with the tube and means between the two sleeves to keep the valves normally seated, a track divided into sections and extending underneath the valves, one of said sections being adapted to move vertically and to carry a crate of bottles to be filled against the sleeves secured to the tubes of the valves, and means adapted to be operated to raise the section carrying the crates whereby the bottles may be filled, substantially as set forth.

11. In an apparatus for filling bottles, a frame, a tank supported on said frame, a series of valve-seats in the tank, a series of valves connected to and extending into the tank, each of said valves consisting of a tube having an opening at or near the upper end thereof, a valve on the upper end of the tube adapted to be seated on the valve-seat in the tank, a sleeve having an air-vent therein connected to the tube and adapted to move therewith, a track beneath the valves, the said track adapted to support a receptacle for bottles, and means for moving the valves and the track relatively toward each other whereby the valves and the bottles may be brought in contact and when brought in contact the tubes of the valves are moved to uncover the openings in the tank whereby the liquid may pass into the bottles.

12. In an apparatus for filling bottles, a frame, a tank supported upon the frame, a series of valves connected to the tank, each of said valves consisting of a tube having an opening near the upper end thereof, a sleeve surrounding the tube, said sleeve securing the valve to the tank, another sleeve having an air-vent therein connected to the tube and adapted to be moved with the tube, a track located underneath the valves said track adapted to support crates carrying bottles, and means for moving the bottles and valves relatively toward and from each other so that when the valves and bottles contact the tube will be moved through the first sleeve and the openings in the tank uncovered and the liquid permitted to pass to the bottles, and when the valves and bottles move from each other the valves will be closed to cut off the supply of liquid to the bottles.

In testimony whereof we affix our signatures in the presence of two witnesses.

RALPH G. WRIGHT.
    KIRK K. WRIGHT.

Witnesses:
 H. J. AUER,
 CLIFFORD HUBBELL.